US012180780B2

(12) United States Patent
Kunkel

(10) Patent No.: US 12,180,780 B2
(45) Date of Patent: *Dec. 31, 2024

(54) SASH RETENTION SYSTEM

(71) Applicant: Milgard Manufacturing LLC, Tacoma, WA (US)

(72) Inventor: Troy Kunkel, Olympia, WA (US)

(73) Assignee: MILGARD MANUFACTURING LLC, Tacoma, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/072,394

(22) Filed: Nov. 30, 2022

(65) Prior Publication Data

US 2023/0160253 A1 May 25, 2023

Related U.S. Application Data

(60) Continuation of application No. 17/095,513, filed on Nov. 11, 2020, now Pat. No. 11,530,570, which is a division of application No. 16/155,261, filed on Oct. 9, 2018, now Pat. No. 10,876,348.

(51) Int. Cl.
*E06B 3/32* (2006.01)
*E06B 3/06* (2006.01)
*E06B 3/44* (2006.01)

(52) U.S. Cl.
CPC .............. *E06B 3/4407* (2013.01); *E06B 3/06* (2013.01); *E06B 2003/4484* (2013.01)

(58) Field of Classification Search
CPC ... E06B 3/06; E06B 3/4407; E06B 2003/4484
See application file for complete search history.

(56) References Cited

U.S. PATENT DOCUMENTS 4,095,968 A * 6/1978 Bristow .................... E06B 3/06 29/445
4,194,331 A 3/1980 Gingle et al.
5,014,466 A 5/1991 Winner
5,603,585 A 2/1997 Bruchu et al.
6,308,475 B1 10/2001 Crish et al.
6,318,036 B1 11/2001 Siudzinski et al.
6,615,890 B1 9/2003 Sigafoes
7,707,779 B2 5/2010 Petta et al.
7,997,037 B2 8/2011 Crandell et al.
8,230,646 B2 7/2012 McDaniel
8,245,462 B2 8/2012 Miethe et al.
8,973,315 B2 3/2015 Massey
9,021,754 B2 5/2015 Wörmann et al.
11,530,570 B2 * 12/2022 Kunkel .................... E06B 3/06
2007/0137119 A1 6/2007 Guillemette
2009/0277111 A1 * 11/2009 Albrecht .................. E06B 3/08 29/897

(Continued)

FOREIGN PATENT DOCUMENTS

JP 11324526 A 11/1999

*Primary Examiner* — Basil S Katcheves
(74) *Attorney, Agent, or Firm* — RATHE LINDENBAUM LLP

(57) ABSTRACT

A fenestration assembly comprises a frame having a first jamb and a second jamb parallel to and spaced from the first jamb; a movable sash movably mounted to the frame; a fixed sash fixedly attached to the frame; a plurality of clips coupling the fixed sash to the frame; and an adhesive connector securing an outer face of the fixed sash to the frame.

10 Claims, 9 Drawing Sheets

(56) References Cited

U.S. PATENT DOCUMENTS

| | | | |
|---|---|---|---|
| 2009/0304956 | A1 | 12/2009 | Probster et al. |
| 2013/0000232 | A1* | 1/2013 | Weiss ................ B32B 17/10055 52/656.1 |
| 2014/0186103 | A1* | 7/2014 | Campbell ............... E06B 1/524 403/280 |
| 2016/0273263 | A1* | 9/2016 | Farina ....................... E06B 3/16 |
| 2017/0074029 | A1* | 3/2017 | Fetting .................... B32B 15/20 |
| 2017/0254073 | A1* | 9/2017 | Gallina ..................... E06B 3/06 |
| 2018/0298677 | A1 | 10/2018 | Alkhoury et al. |

* cited by examiner

SASH RETENTION SYSTEM

CROSS-REFERENCE TO RELATED PATENT APPLICATIONS

This application is a continuation of U.S. patent application Ser. No. 17/095,513, filed Nov. 11, 2020, which is a divisional of U.S. patent application Ser. No. 16/155,261, now U.S. Pat. No. 10,876,348, filed Oct. 9, 2018, both entitled SASH RETENTION SYSTEM, which are hereby incorporated by reference in their entirety.

BACKGROUND

The present invention relates generally to the field of fenestration assemblies, and more particularly to a system for fixedly securing a sash to a frame.

SUMMARY

In one embodiment a fenestration assembly comprises a frame having a first jamb and a second jamb parallel to and spaced from the first jamb; a movable sash movably mounted to the frame; a fixed sash fixedly attached to the frame; a plurality of clips coupling the fixed sash to the frame; and an adhesive connector securing an outer face of the fixed sash to the frame In one embodiment a method of assembling a fenestration includes providing a frame having a first jamb and a second jamb spaced from and parallel to the first jamb. At least one clip is secured to the first jamb and at least the second jamb. A first sash is provided having a first stile and a second stile spaced from and parallel to the second stile. A first side of a double-sided adhesive is secured to each of the first stile and the second stile of the first sash. The first sash is positioned within the frame wherein the clips provide a biasing force to center the first sash between the first jamb and the second jamb. The first sash is secured to the frame with a second side of the double-sided adhesive.

In another embodiment a method of assembling a fenestration includes providing a fenestration frame having a first jamb and a second jamb spaced from and parallel to the first jamb, and a header. A further step includes selecting one of a glazing assembly secured to a sash frame and a glazing assembly free of a sash frame, wherein the glazing assembly free of a sash frame has a width greater than the glazing assembly secured to the sash frame. The selected glazing assembly is secured to the fenestration frame.

DETAILED DESCRIPTION OF THE EXAMPLE EMBODIMENTS

Figure 1:
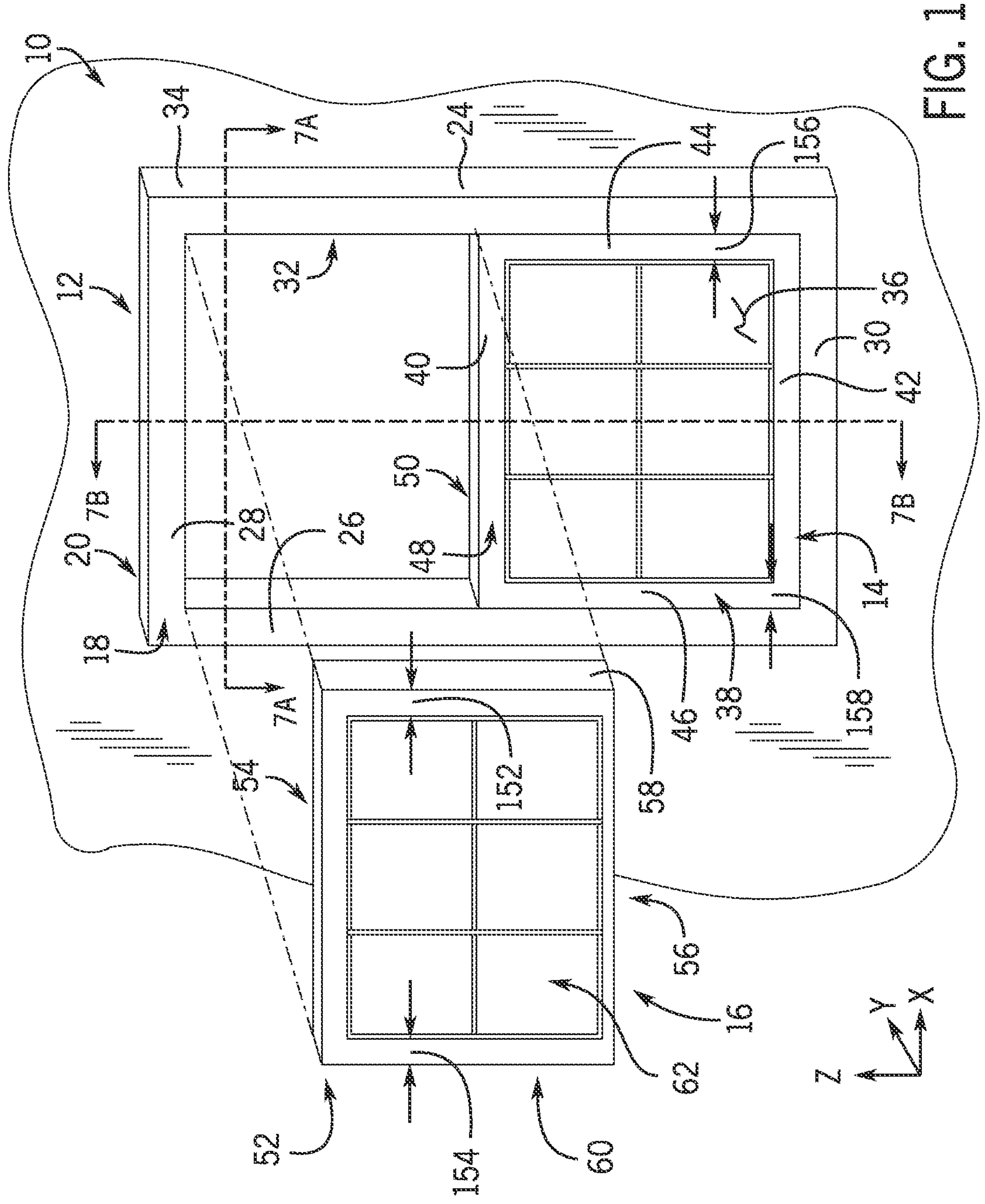
FIG. 1 is an isometric view of a window assembly as viewed from an interior of an enclosure.

Referring to FIG. 1, a fenestration such as a window 10 is shown as a single hung window including a window frame 12, a movable first or lower sash 14, a second fixed or upper sash 16. The window 10 is shown disposed vertically and includes an exterior or outer side 18 generally opposite an interior or inner side 20.

For purposes of this application, unless otherwise specified, an interior side of a window is generally the side of the window facing an interior of a house, room, or other defined or enclosed space, and the exterior side of a window is generally the side of the window facing an exterior of a house, room, or other defined or enclosed space. Also, the "front" of an element is defined from the perspective of an operator facing the interior 20 of the window 10. The "rear" of an element is generally defined as opposing the "front" (e.g., extending away from the front) of the window. The forward and rearward directions are generally aligned along the y-axis as shown in FIG. 1. The vertical direction is the direction generally aligned with the force of gravity along the z-axis as shown in FIG. 1. The cross direction or left and right directions is the direction generally aligned with the x axis as shown in FIG. 1. The left and right sides are defined by a view from a user viewing the window from the interior of the enclosure.

The bottom of an element generally faces or extends toward the ground (i.e., the surface of the earth) and the top of an element generally faces or extends away from the ground and the bottom.

The window frame 12 is shown including a first vertical or side jamb 24 disposed generally opposite a second vertical or side jamb 26 and an upper jamb or header 28 disposed generally above a second transverse lower jamb or sill 30 (the transverse jambs extending generally in the x-direction as defined in FIG. 1). The window frame 12 provides support for the first sash 14, the second sash 16, and other elements of window 10. The first vertical jamb 24 includes a first side or surface 32 disposed proximate the first sash 14 and an outer side or surface 34 disposed distal to the first sash 14 relative to surface 32.

The term fully closed refers to the orientation of the movable sash when the movable sash covers the area between the frame members and the upper fixed sash. The term open refers to the condition in which the movable sash 14 is moved in a direction from the sill 30 toward the header 28 and there is a region between the jamb 24, jamb 26, sill 30 and upper fixed sash 16 which is not covered. When the movable sash 14 is in the fully open position it may be possible to pass an object from the interior side to the exterior side between the area defined by jamb 24, jamb 26, sill 30 and the upper fixed sash 16. The term fully open refers to the orientation of the movable sash when the movable sash is moved toward the header 28 as far as the geometry of the frame and movable sash allows. It is understood that the movable sash moves from a fully closed position to an open position to a fully open position. The open position includes all of the positions between the fully closed position through and including the fully open position. Stated another way the open position includes both the fully open position and all partially open positions in which the movable sash is between the fully closed position and the fully open position.

Referring to FIG. 1, the movable sash 14 is shown including a glazing 36 and a sash frame 38. The glazing 36 is confined within and supported by the sash frame 38. The sash frame 38 includes an upper rail 40 generally opposite a lower rail 42 and a first stile 44 generally opposite a second stile 46. When the window is orientated vertically such that movable sash 14 moves from a fully closed position to a fully open position in a direction opposite the direction of gravity (extending along the z-axis), then the upper rail 40 and the lower rail 42 are oriented generally horizontally (extending along the x-axis) and disposed substantially above and below the glazing 36, respectively. The first stile 44 and the second stile 46 are generally perpendicular to the upper rail 40 and the lower rail 42 and are disposed at the sides of the glazing 36. The sash frame 38 further includes an outer surface 48 generally opposite an inner surface 50.

In one embodiment the first sash 14 is slidable relative to frame 12 between a fully closed position to a fully open position. In one embodiment first sash 14 may be tiltable sash that is pivotally coupled to window frame 12, providing for the first sash 14 to be pivotally moved between a non-tilted position and a tilted position as is known in the art. The first sash 14 may be pivoted about a horizontal axis that is generally parallel to lower rail 42. In a tilted position, the first sash 14 is disposed at an angle relative to a plane defined by the frame 12. In one embodiment in the tilted position the upper rail 40 moves inwardly along the y-axis such that the upper rail 40 is further from a plane defined by the header 12, sill 30 and first and second stiles 24, 26 than the lower rail 42.

Figure 2:
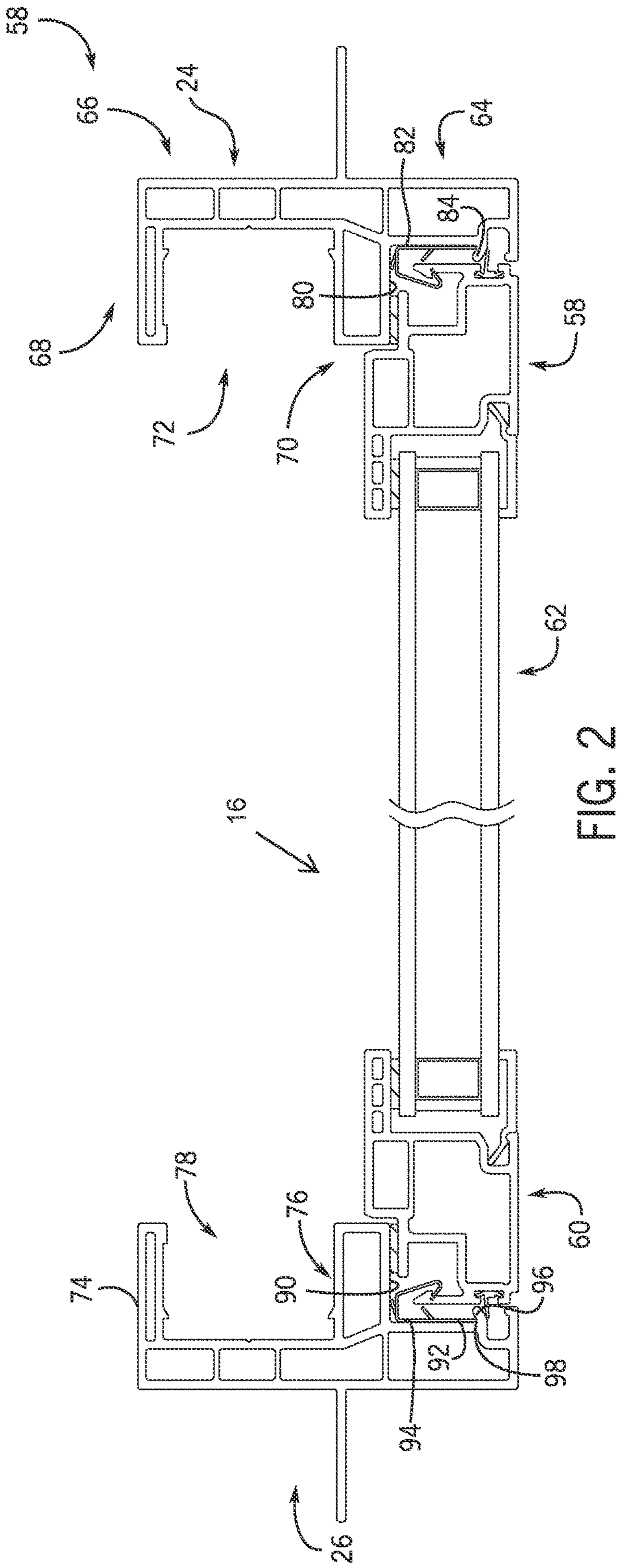
FIG. 2 is a cross section taken generally along line 2-2 of FIG. 1.

Upper fixed sash 16 includes a sash frame 52 is an upper rail 54, a lower rail 56, a first stile 58 and a second stile 60. A glazing 62 extends between upper rail 54, lower rail 56, first stile 58 and second stile 60. Referring to FIG. 2, upper sash 16 is fixedly secured to an outer portion 64 of frame 12, while lower sash 14 is movably secured to an inner portion 66 of frame 12.

Referring to FIG. 2, inner portion 66 of frame 12 includes a first member 68 extending from jamb 24 toward jamb 26 and a second member 70 extending from jamb 24 toward jamb 26 and generally parallel to first member 68. A channel 72 is defined by the region between jamb 24, first member 68 and second member 70. Similarly, extending from second jamb 26 is a first member 74 extending from second jamb stile 26 toward first jamb 24 and a second member 76 extending from second jamb 26 toward first jamb 24 and generally parallel to first member 74. A channel 78 is defined by the region between second jamb 26, first member 74 and second member 76. In one embodiment movable sash 14 is slidably received within channels 72 and 78.

Figure 3A:
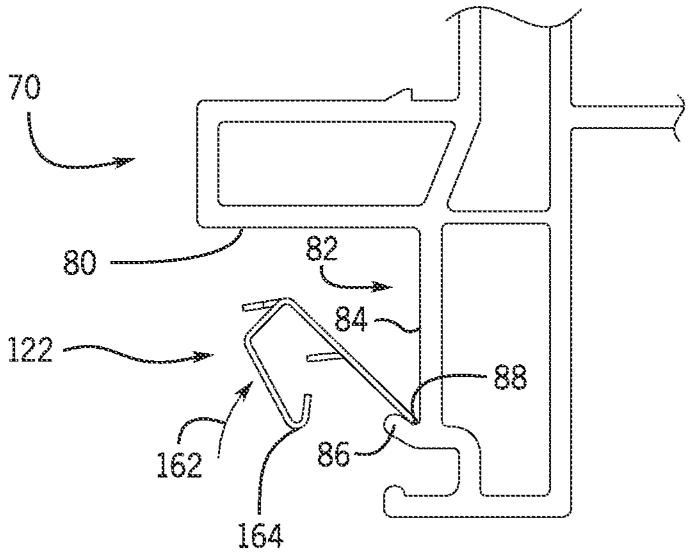
FIG. 3A is partial cross section of a clip being inserted into a frame.

Referring to FIG. 2 and FIG. 3A outer portion 64 includes outer surface 80 of second member 70 and a clip receiving portion 82 having a surface 84 of first jamb 24 facing second jamb 26 extending from outer surface 80 of second member 70 toward the outermost portion of first jamb 24. A tab member 86 extends from portion 82 in a vector direction both toward outer surface 80 of second member 70 and second jamb 26. The intersection of tab 86 and portion 82 defines a corner receiving region or pivot portion 88.

Similarly, outer portion 64 includes outer surface 90 of second member 76 and a clip receiving portion 92 having a surface 94 of second jamb 26 facing first jamb 24 extending from outer surface 90 of second member 76 toward the outermost portion of second jamb 26. A tab member 96 extends from portion 92 in a vector direction both toward outer surface 90 of second member 76 and first jamb 24. The intersection of tab member 96 and portion 92 defines a corner receiving region or pivot portion 98.

Figure 3B:
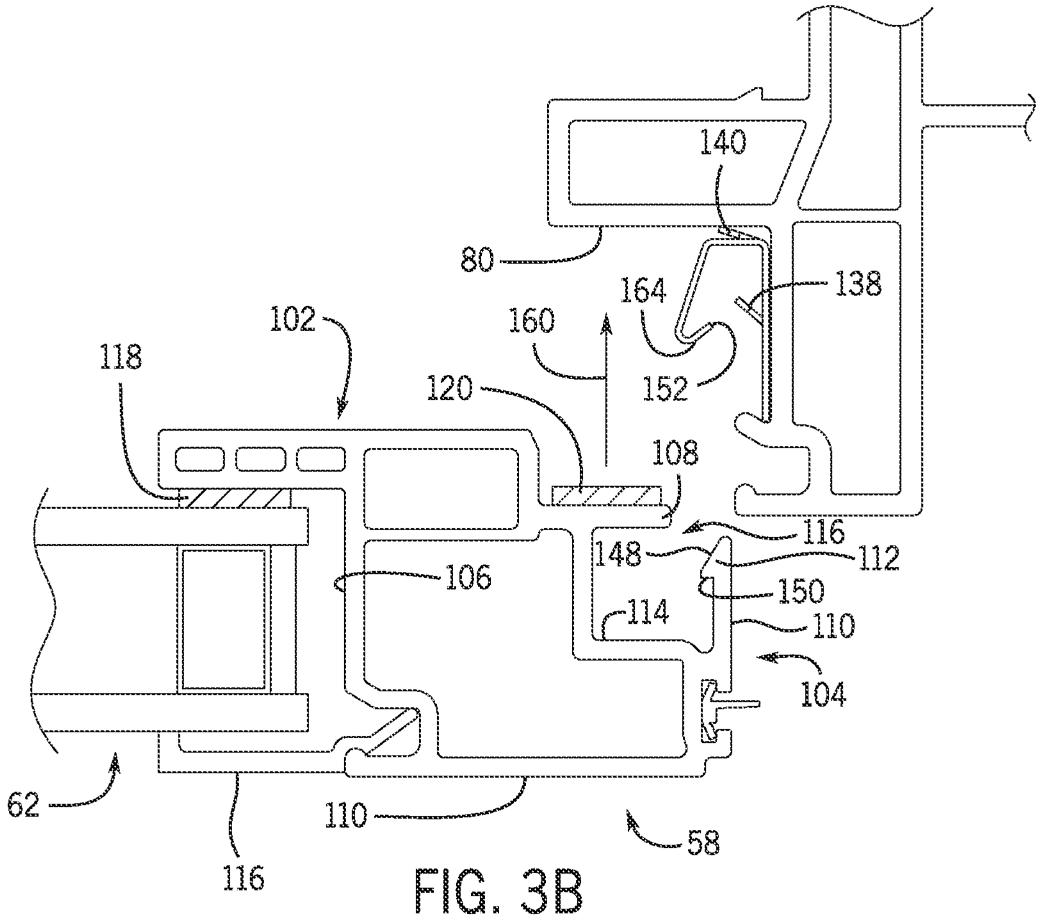
FIG. 3B is a partial exploded cross section of a first side of the fixed sash moving in a direction to be secured to the frame.

Referring to FIGS. 2 and 3B, stile 58 of fixed sash 16 includes outer surface 100 and an opposing inner surface 102, a first clip receiving side 104 and an opposing second glazing receiving side 106. Inner surface 102 includes a member 108 that is positioned adjacent surface 80 when second sash 16 is operatively secured to frame 12 with connector 120. First clip receiving side 104 includes a snap leg 110 having a free barbed end 112. A clip receiving cavity 114 defines an opening 116 between member 108 and barbed end 112.

Figure 3C:
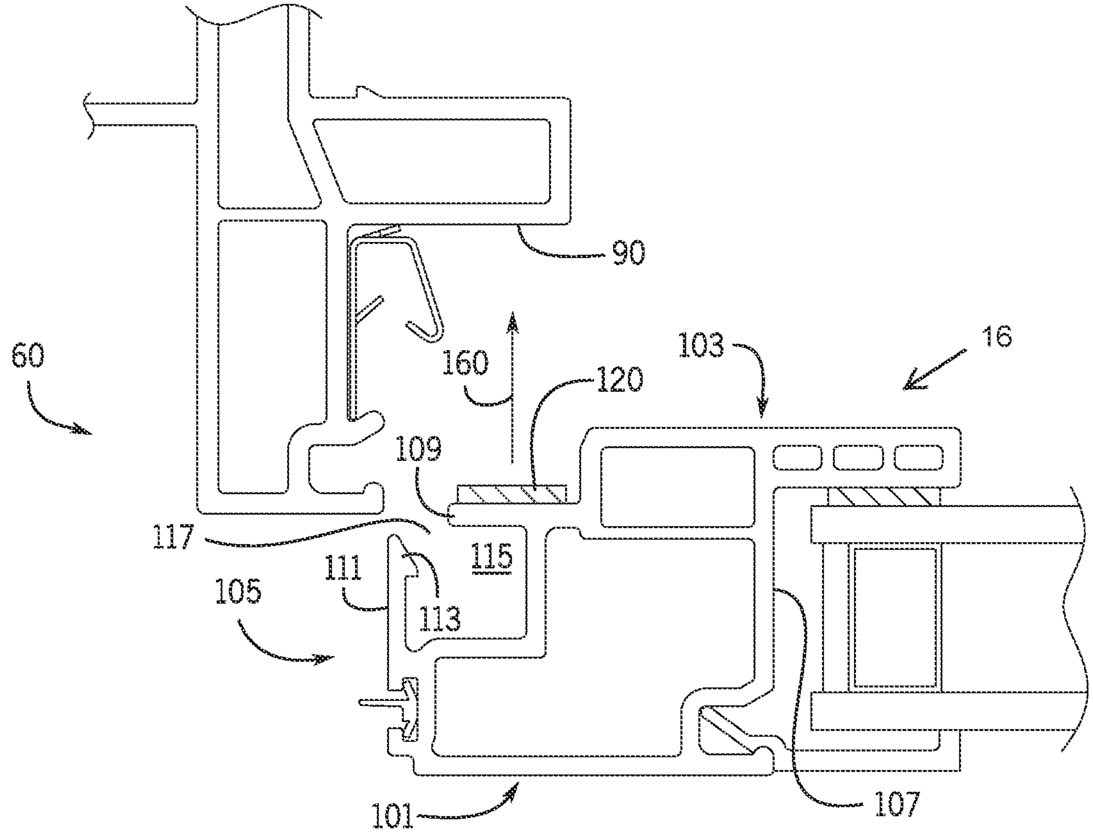
FIG. 3C is a partial exploded cross section of a second side of the fixed sash moving in a direction to be secured to the frame.

Referring to FIGS. 2 and 3C, second sash 16 stile 60 has similar features to those discussed above with respect to stile 58. Stile 60 includes outer surface 101 and an opposing inner surface 103, a first clip receiving side 105 and an opposing second glazing receiving side 107. Inner surface 103 includes a member 109 that is positioned adjacent surface 90 when second sash 16 is operatively secured to frame 12 with a connector 120. First clip receiving side 105 includes a member 111 having a free barbed end 113. A clip receiving cavity 115 defines an opening 117 between member 109 and barbed end 113.

Figure 3D:
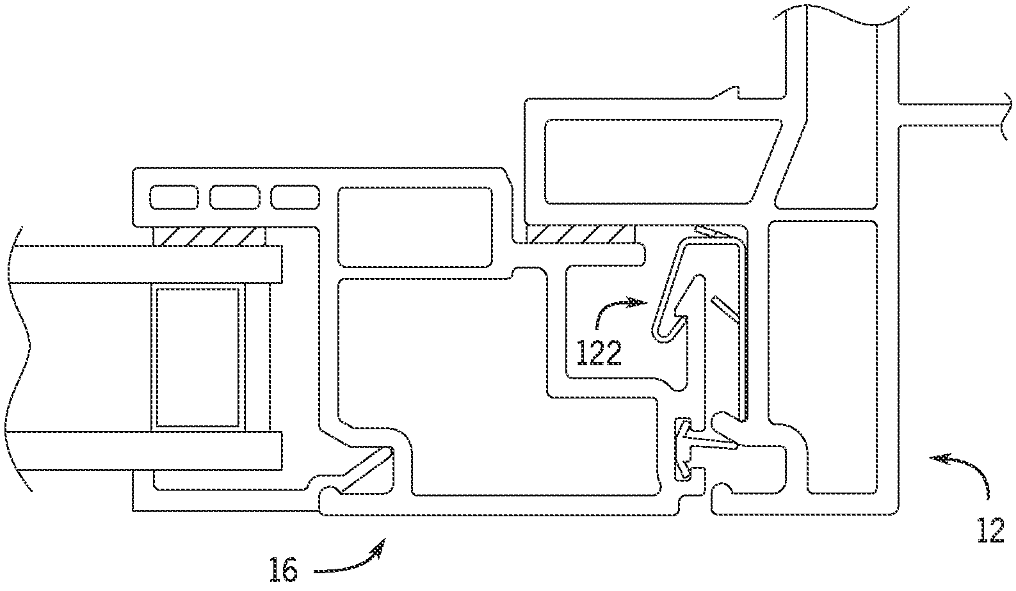
FIG. 3D is a partial cross section of the fixed sash secured to the frame.
Figure 4:
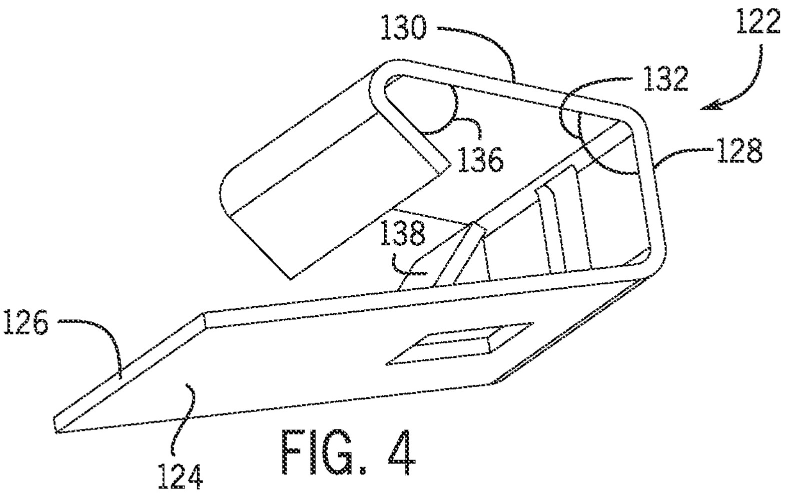
FIG. 4 is an isometric view of the clip.
Figure 5:
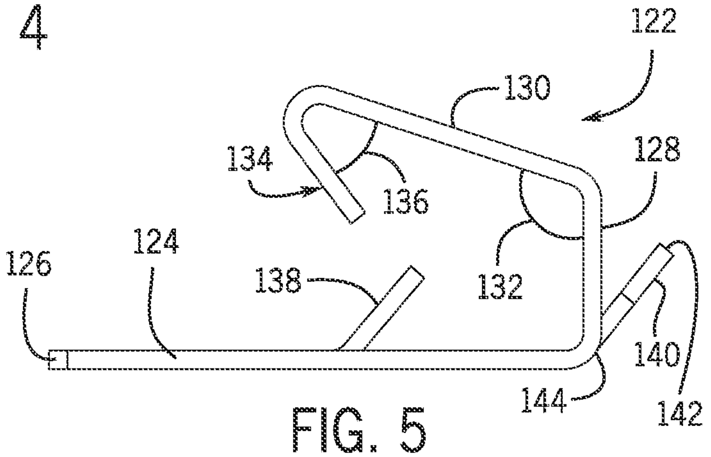
FIG. 5 is a side view of the clip.
Figure 6:
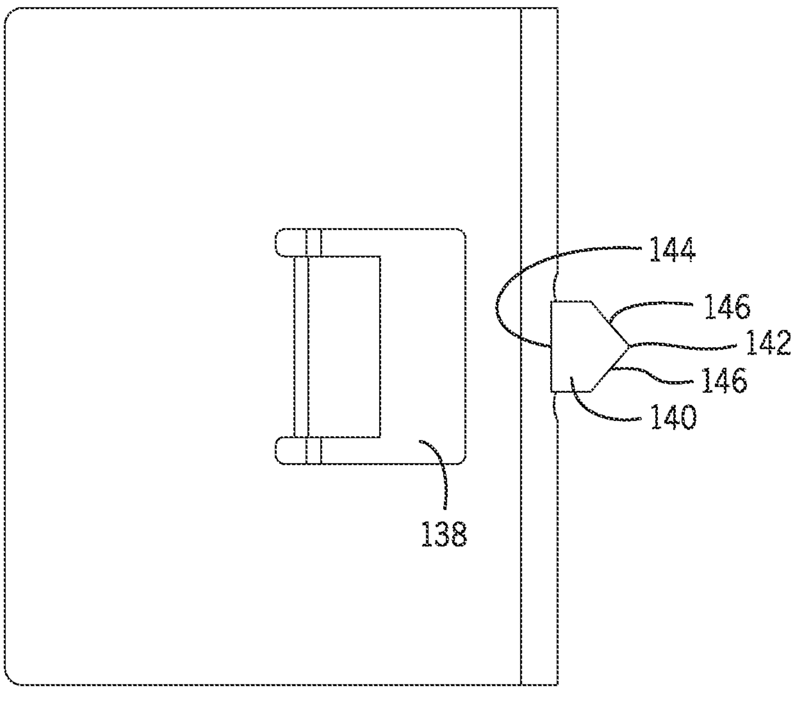
FIG. 6 is a bottom view of the clip.

In one embodiment connectors 120 are double-sided tape that operative secures members 108, 109 to surfaces 80, 90 of stiles 58, 60 respectively. However other connectors 120 known in the art may also be used, such as a bead of adhesive materials that operates to bond fixed sash 16 to frame 12. Referring to FIG. 3D fixed sash 16 is secured to frame 12 with a plurality of connectors 120 and clips 122. Referring to FIGS. 4-7 each clip 122 includes a first leg 124 having a free end 126. A second leg 128 extends from first leg 124 opposite free end 126. In one embodiment second leg 128 extends about 90 degrees from first leg 124. A third leg 130 extends from second leg 128 at an obtuse angle 132. A fourth leg 134 extends from third leg 130 at an acute angle 136. A tab 138 formed from a portion of first leg 124 extends therefrom in a direction toward the third leg 130. A second tab 140 formed from a portion of second leg 128 extends therefrom in a direction away from fourth leg 134. As described below the clips provide for attachment of fixed sash 16 to frame 12. Clips 122 allow for easy and repeatable location of fixed sash 16 to frame 12, immediately prior to engagement of the double-sided tape connectors 120 that fully secures fixed sash 16 to frame 12. Tab 140 terminates in a point 142 that pierces frame 12.

Referring to FIG. 3A terminal end 126 of first leg 124 of clip 122 is positioned within pivot point 88 and clip 122 is then rotated about point 88 in direction 162 until first leg 124 is adjacent surface 84 of clip receiving portion 82. Pointed tip 142 of tab 140 engages surface 80 such that tip 142 pierces or digs into surface 80. In one embodiment frame 12 is formed from a vinyl material and clip 122 is formed from a metal material. However, other materials are also contemplated. For example, frame 12 may be wood or fiberglass and clip 122 may be formed from a plastic material. In one embodiment tab 140 flexes about an attachment or region 144 of second leg 128 as the tip 142 of tab 140 engages and digs into or is biased against surface 80 of frame 12. In one embodiment tip 142 defines a point from two sloping portions 146. Stated another way leading edge 126 of clip 122 is hooked under a bent leg 86 defined by point or line 88 and as clip 122 is rotated about line 88 clip 122 is retained in a clip receiving portion 82 through engagement of pointed barb or pointed tip 142 with the vinyl surface of the frame.

Referring to FIG. 3B first tab 138 extends away from surface 84 at an angle toward surface 80. As fixed sash 16 is moved toward surface 80 and surface 90 a surface 148 of barbed end 112 engages terminal fourth leg 134 of clip 122. The fourth leg 134 of opposing clips 122 positioned adjacent stiles 58 and 60 act to center fixed sash 16 between stiles 58 and 60. Tab 138 of opposing clips 122 further act to center fixed sash 16 between stiles 58 and 60. As barb 112 moves toward surfaces 80, 90 fourth leg 134 is pushed away from first leg 138 until a bottom edge 150 of barb 112 clears terminal end 152 of fourth leg 134. Tip 152 of fourth leg 134 moves to a engage the region defined by the intersection of a bottom edge 150 of tab 112 and member 110.

In one embodiment clips 122 are secured to frame 12 without the need for a separate fastener. Stated another way clips 122 may be secured to frame 12 fastener free. Clip 122 in an installed position is biased toward tab 86 by tab 140 and is prevented from moving away from surface 84 by the tab digging into or being biased against surface 80. Tab 140 acts as a spring in the in/out direction and acts to keep clip adjacent surface 84 by the tip of tab 140 digging into surface 80.

The plurality of clips 122 allow the use of a double-sided tape connector 120 to be used as an attachment method between the fixed sash and the frame without an additional guide member or jig positioning sash 16 within the frame. Clips 122 act to center the fixed sash 16 within the frame 12 and therefore eliminate the need for a complicated and/or expensive guide to ensure proper placement of the fixed sash 16 within frame 12.

In one embodiment at least one 22 is disposed on an upper region of first jamb 24 and at least one clip is positioned on an upper region of the second jamb 24. The upper region of the first jamb and the second jamb begin defined as the region proximate the fixed sash 16, or stated another way the region intermediate the movable sash in the fully closed position and the header 28. In one embodiment at least one clip is positioned on the header having similar clip receiving geometry as the first jamb and the second jamb as described herein. In one embodiment, there are at least two clips on each of the first jamb and the second jamb that are opposite one another. In one embodiment there are more than two clips on each of the first jamb and second jamb.

In one embodiment the visible width 152, 154 of stiles 58 and 60 as viewed from the exterior of the building or room is substantially the same of the visible width 156, 158 of the stiles 44, 46 as viewed from the exterior of the building. The visible width is the distance measured between a left edge of the stile and a right edge of the stile in a direction perpendicular to the longitudinal axis of the stile. Referring to FIG. 1 the visible width is taken along the x axis. The fenestration assembly as described herein provides the appearance that the window is a double hung window even though the upper sash 16 is fixed to the frame with clips 22 and connector 120.

In one embodiment fenestration assembly 10 is assembled by first providing a frame 12 having a first jamb 24 and a second jamb 26 spaced from and parallel to the first jamb 24, and a header 28. At least one clip 122 is secured to the first jamb 24 and at least one clip 122 is secured to the second jamb 24 and at least one clip 122 is secured to the header 28. Although all clips are provided the reference numeral 122 they are individual clips. A first sash 16 is provided having a first stile 58 and a second stile 60 spaced from and parallel to the second stile 60. A first side of a double-sided adhesive tape 120 is secured to each of the first stile 58 and the second stile 60 of the first sash 16. The first sash 16 is moved toward the frame 12 generally along a y-axis is shown in FIG. 1 or a direction 160 as shown in FIG. 3B generally perpendicular to plane defined by the glazing or glass 62 of the first sash. Clips 122 secured to the first jamb 24 and the second jamb 26 provide a biasing force to center the first sash 16 between the first jamb 24 and the second jamb 26 as the first sash moves toward the frame 12. The first sash 16 is non-movably secured to the frame 12 with a second side of the double-sided adhesive 120. A second sash 14 is operatively secured to the frame 12 as is known in the art such that second ash is movable between a fully closed position and a fully open position.

Referring to FIG. 3B as sash 16 enters into frame 12 in a direction 160 snap leg 110 impacts a leading edge 164 clip 122 preventing connector 120 from engaging with frame 12 until additional force is applied. The application of additional force causes the mating of angled surfaces of clip 122 and snap leg 110 to draw sash 16 toward frame 12. Once sash 16 is fully seated against frame 12, the sash 16 has been consistently drawn toward frame 12 and the double-sided tap 120 has engaged with frame 12 locking sash 16 into an installed and fixed position. Additionally, clip 122 and sash snap leg 110 interlock to give additional support and provides feedback to an assembler that sash 16 is fully seated into frame 12.

Figure 7A:
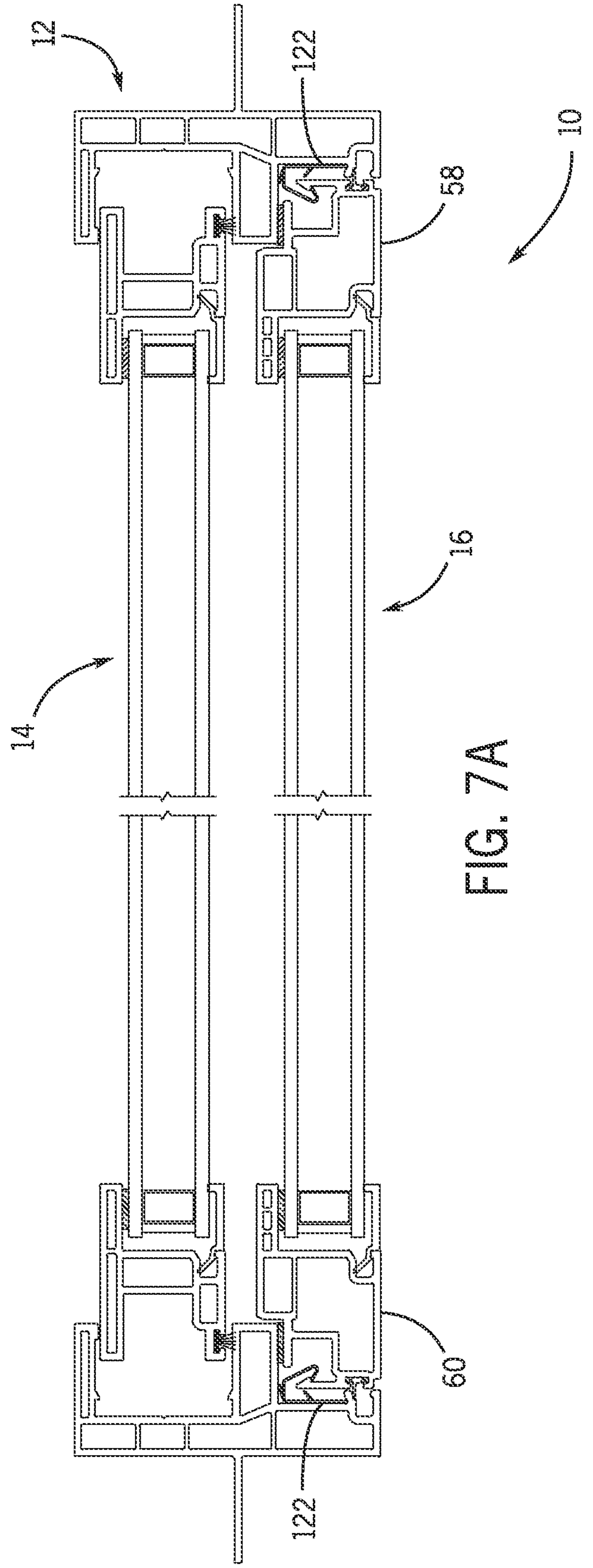
FIG. 7A is a cross sectional view taken generally along line 7A-7A of FIG. 1.
Figure 7B:
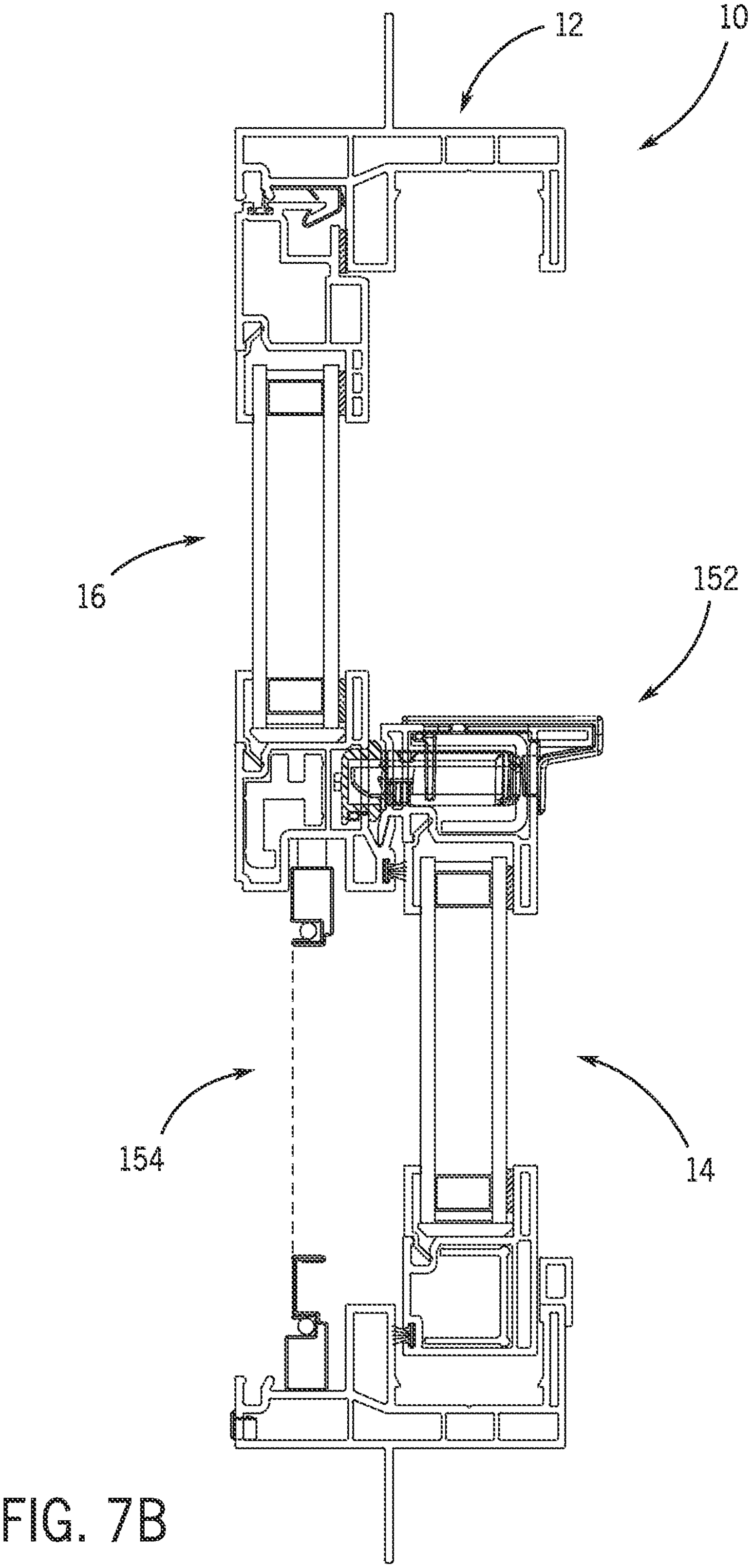
FIG. 7B is a cross sectional view taken generally along line 7B-7B of FIG. 1.
Figure 8A:
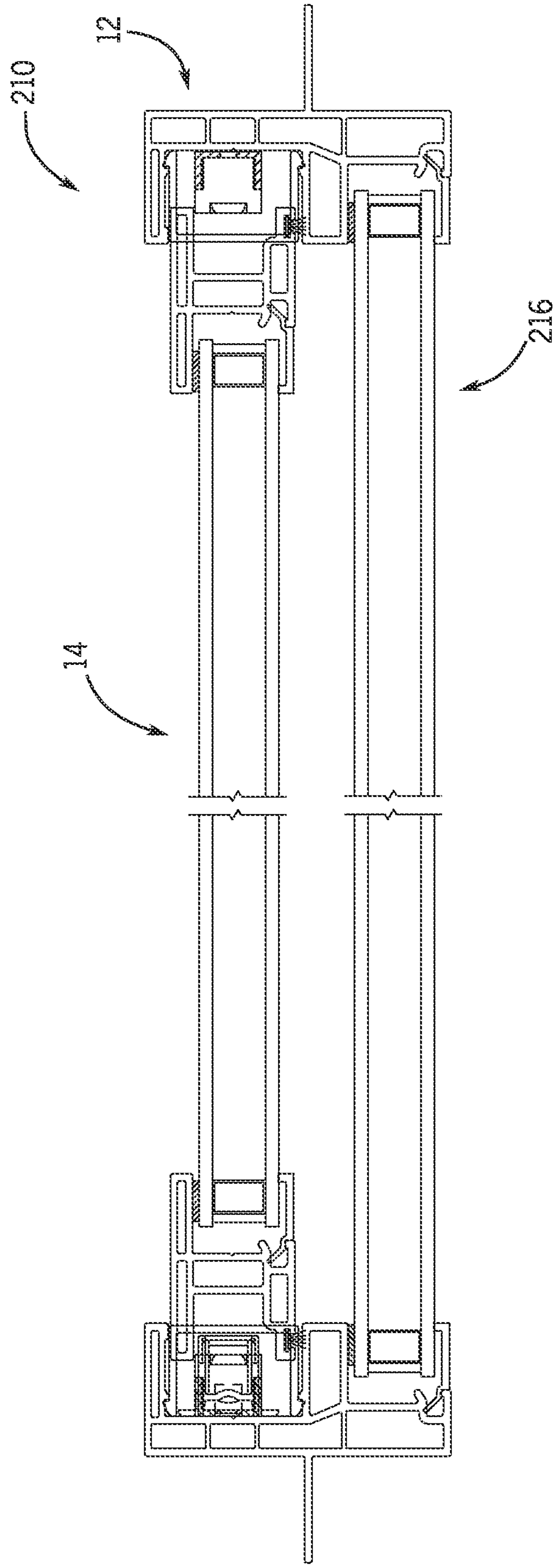
FIG. 8A is a cross sectional view of an alternative embodiment of a single hung window utilizing the same frame of FIG. 1 and taken generally along line 7A-7A of FIG. 1.
Figure 8B:
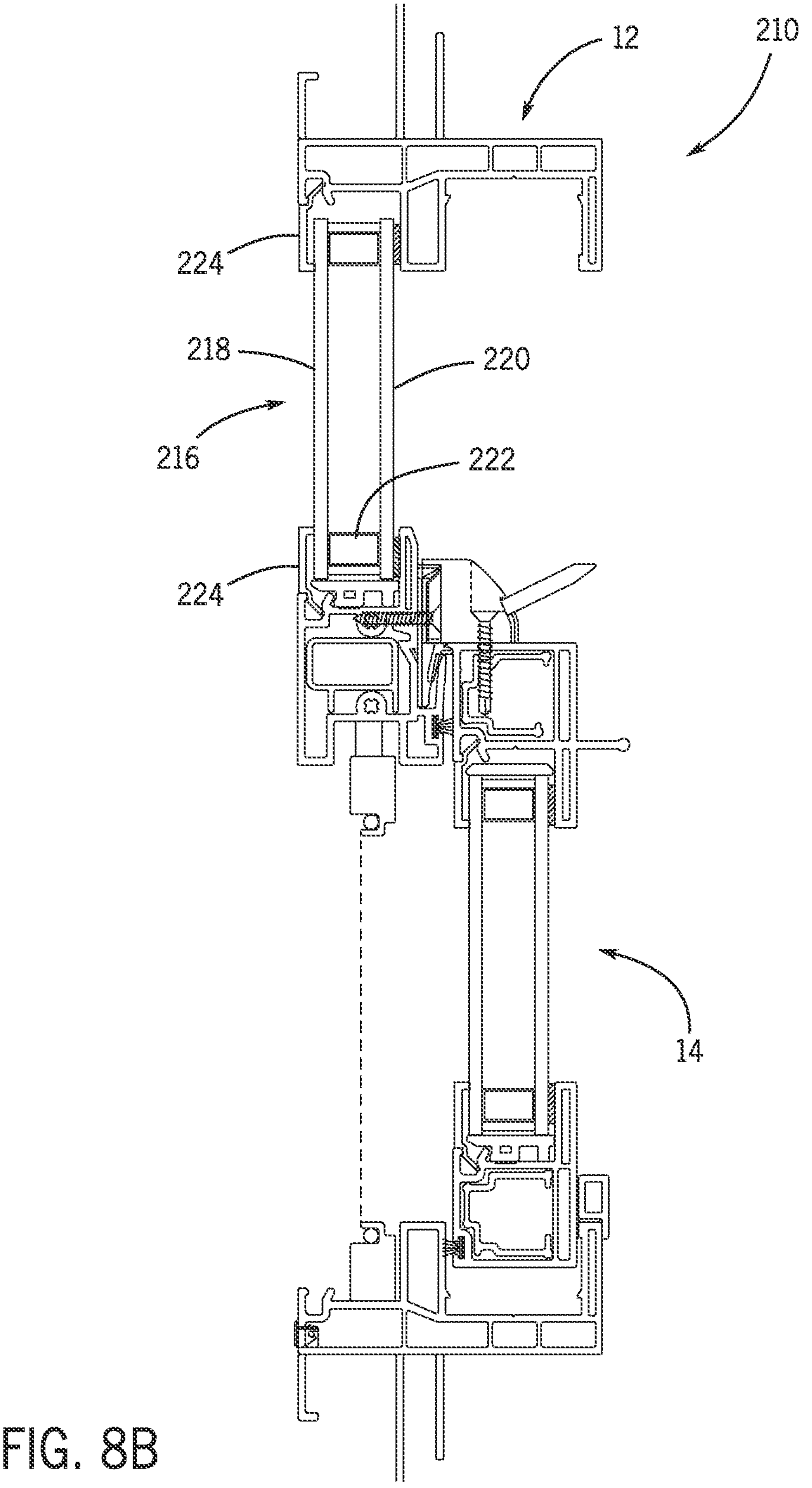
FIG. 8B is a cross sectional view of an alternative embodiment of a single hung window utilizing the same frame of FIG. 1 and taken generally along line 7B-7B of FIG. 1.

Referring to FIGS. 7A and 7B the fenestration assembly 10 provides a desired sightline around the perimeter of the entire frame 12. In this fenestration assembly 10 there is an equal gap between the frame 12 and first sash 14 and second sash 16 about the entire perimeter. Referring to FIGS. 8A and 8B the geometry of frame 12 may be used in a single bung configuration 210 in which a glazing assembly 216 may be secured directly to frame 12 without a fixed sash frame. Stated another way glazing assembly 216 has assembly includes a first sheet of glazing 218 fixed to and separated from a second sheet of glazing 220 with a spacer 222. The outer perimeter of first and second glazing sheets are not secured directly to frame 12 without a rails and stiles. Rather the second sheet of glazing is adhered to frame 12 with an adhesive and a glazing bead 224 secured to frame 12 covers at least part of the periphery of the first sheet of glazing 218. Referring to FIG. 8A the width of the first and second glazing sheets are wider than the first and second glazing sheets of the movable sash 14. In contrast referring to FIG. 7A the width of the first and second glazing sheets are substantially the same. In one embodiment the width of the first and second glazing sheets are the same.

In another embodiment a method of assembling a fenestration includes providing a fenestration frame 12 having a first jamb and a second jamb spaced from and parallel to the first jamb, and a header. A further step includes selecting one of a glazing assembly secured to a sash frame 16 and a glazing assembly 216 free of a sash frame, wherein the glazing assembly 216 free of a sash frame has a width (in the x direction shown in FIG. 1) greater than the glazing assembly 16 secured to the sash frame. The selected glazing assembly is secured to the fenestration frame 12. If the selected glazing assembly is the glazing assembly secured to a sash frame then the glazing assembly is secured to the fenestration frame 12 as described above.

Although the present disclosure has been described with reference to example embodiments, workers skilled in the art will recognize that changes may be made in form and detail without departing from the spirit and scope of the defined subject matter. Although the embodiment presented is a vertical single hung window, the fenestration assembly may also be a horizontal slider or a picture window in which the glazing assembly includes a sash frame being attached to the frame in one embodiment and wherein the glazing assembly may also be directly secured to the frame without a separate sash frame. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described is manifestly intended to be as broad as possible. For example, unless specifically otherwise noted, the definitions reciting a single particular element also encompass a plurality of such particular elements.

What is claimed is:

1. A fenestration assembly comprising:

a frame having a first jamb and a second jamb parallel to and spaced from the first jamb;

a movable sash movably mounted to the frame;

a fixed sash fixedly attached to the frame;

a plurality of clips coupling the fixed sash to the frame; and an adhesive connector securing an outer face of the fixed sash to the frame;

wherein each clip contacts a first surface of the frame being parallel to a glazing of the fixed sash and each clip contacts a second surface of the frame being perpendicular to the glazing of the fixed sash;

wherein each clip includes a tab contacting the first surface of the frame and a first leg having a free end contacting a receiving portion on the frame adjacent the second surface of the frame.

2. The fenestration assembly of claim 1, wherein each clip has a first portion that biases the fixed sash between and perpendicular to the first jamb and the second jamb.

3. The fenestration assembly of claim 2, wherein the tab digs into the frame to maintain the clip positioned within the frame prior to the fixed sash being attached to the frame.

4. The fenestration assembly of claim 2, wherein the plurality of clips are spaced along the first jamb and the second jamb.

5. The fenestration assembly of claim 4, wherein the first portion of the clips center the fixed sash between the first jamb and the second jamb.

6. The fenestration assembly of claim 5, wherein the plurality of clips are secured to the frame fastener free.

7. The fenestration assembly of claim 6, wherein the adhesive connector is a doubled sided tape having a first side secured to the fixed sash prior to a second side of the doubled sided tape being secured to the frame.

8. The fenestration assembly of claim 5, wherein the fixed sash includes a first pair of stiles having a visible width substantially equal to the visible width of a second pair of stiles on the movable sash.

9. The fenestration assembly of claim 2, where at least one clip is secured to a header of the frame to position the first sash relative to the header as the first sash is moved toward the frame.

10. The fenestration assembly of claim 1, further including a weather stripping positioned between the fixed sash and the frame independent of the clip.

* * * * *